May 23, 1961 W. S. BUSLIK 2,985,863

MAGNETIC SCANNER

Filed Dec. 20, 1957 2 Sheets-Sheet 1

INVENTOR
WALTER S. BUSLIK

BY

Murray Nanes

ATTORNEY

May 23, 1961 W. S. BUSLIK 2,985,863

MAGNETIC SCANNER

Filed Dec. 20, 1957 2 Sheets-Sheet 2

United States Patent Office 2,985,863
Patented May 23, 1961

2,985,863

MAGNETIC SCANNER

Walter S. Buslik, Poughkeepsie, N.Y., assignor to International Business Machines Corporation, New York, N.Y., a corporation of New York Filed Dec. 20, 1957, Ser. No. 704,189

4 Claims. (Cl. 340—149)

This invention relates to the scanning of characters printed in magnetic ink, and more particularly to means for successively scanning slices of magnetic ink characters, preparatory to identification of the characters, by utilizing a plurality of adjacent offset scanning means having a common signal output means.

In the new electronic computers and data processing machines, it has become desirable to enter information by the direct reading of printed characters. In order to be able to read directly, a means for successively scanning adjacent slices of the characters may be utilized. One scanning means for characters printed in ordinary ink, well known in the art, successively scans slices of the character with a flying spot scanner which utilizes the beam from a cathode ray tube as a source of light. Photocells operate during the scanning to detect the difference between the reflections of this light beam off the printed character itself and the reflection off the background material. The photocells produce signals which are analyzed by analyzing circuitry to produce output signals indicative of the different character being sensed. This method of character sensing and scanning is a relatively expensive one requiring the complex circuitry of cathode ray tubes. In addition, the background material and equipment for scanning and sensing must be placed in a light free container to keep out the external light.

In the present invention, to more easily sense printed characters, the characters are printed in magnetic ink. The novel scanning and sensing of magnetic ink by the structure of the invention then becomes less expensive and less complex.

It comprises, broadly, a plurality of rotating scanning means each of which provides a flux path that moves with respect to a slice of the printed character and thereby scans the character in one direction. As one rotating scanning means finishes its scan of a slice of the character, an adjacent rotating means starts to scan the adjacent slice of the character. An output means common to all the rotating means senses the change in flux caused by the magnetic ink of the character entering the moving flux path. The sensing of the changes in flux produces a series of signal outputs on the common output line which may then be identified by known character recognition devices.

It is therefore an object of the invention to provide a means for successively scanning adjacent slices of characters printed in magnetic ink.

Another object of the invention is to provide means utilizing a plurality of adjacent rotating scanning devices in the sensing of magnetic ink characters.

Still another object of the invention is to provide a plurality of adjacent scanning means offset by an amount so that each scanning means begins to scan a slice of a background material when the previous scanning means has completed its scan.

A further object of the invention is to provide a plurality of adjacent magnetic scanners having a common output means.

A still further object of the invention is to provide a plurality of adjacent magnetic scanners, the air gaps of which are offset from each other so that each gap will start a scan of a slice of background material when the air gap of a previous adjacent magnetic scanner has completed its scan.

Still another object of the invention is to provide a scanner comprising a plurality of adjacent disks of magnetic material having projections which are offset from each other.

A further object of the invention is to provide a scanner comprising a plurality of adjacent disks of magnetic material having projections which are offset from each other a distance so that each projection will start the scan of a slice of the background material when its preceding projection has finished the scanning of the previous slice.

Other objects of the invention will be pointed out in the following description and claims and illustrated in the accompanying drawings, which disclose, by way of example, the principle of the invention and the best mode, which has been contemplated of applying that principle.

Figure 1:
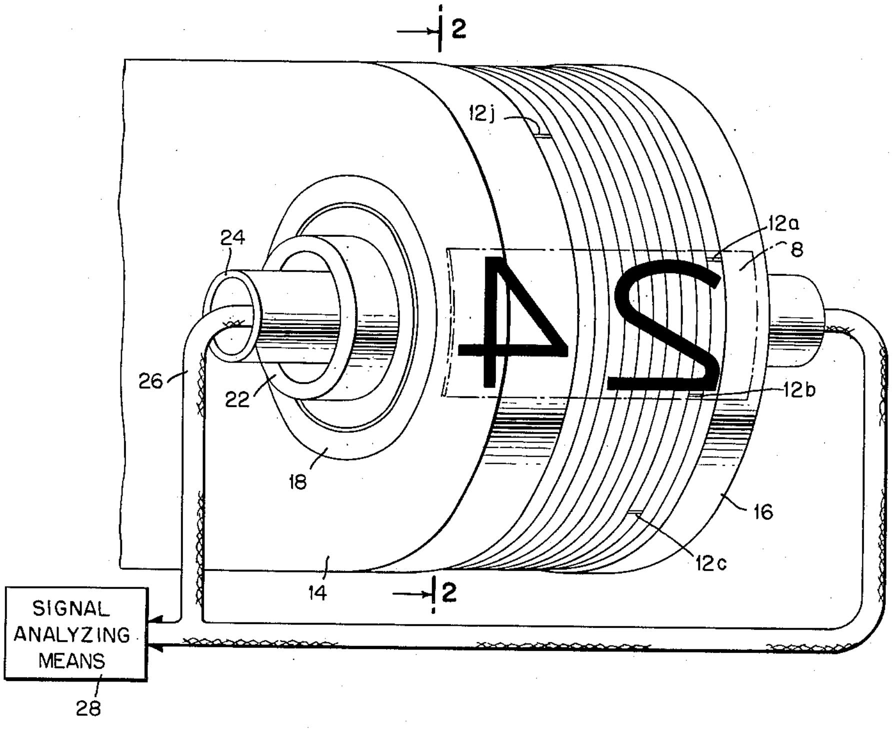
Fig. 1 is a diagrammatic view of a first species of the magnetic ink character sensing device.
Figure 2:
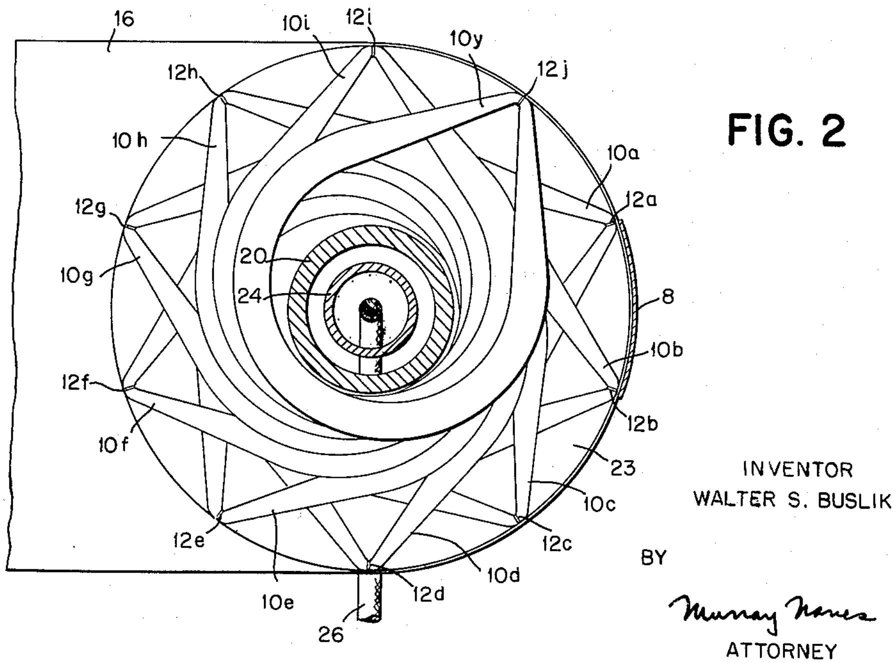
Fig. 2 is a section taken along line 2—2 of Fig. 1.

Referring first to Figs. 1 and 2, a paper tape 8 is shown near the novel scanning means. The paper tape 8 may be intermittently moved by driving means not shown so that printed magnetic ink characters thereon may be moved to a stationary position where they may be sensed by the scanning means. The back surface of the paper tape 8 is shown in Fig. 1, the front surface of which contains the printed magnetic ink characters in black, shown, for example, as the numerals 2 and 4 in Fig. 1. The manner in which magnetic ink may be printed on the paper is well known in the art.

The novel sensing means includes a plurality of adjacent permanent magnets **10*a* through 10*j* each of which has an air gap 12*a* through 12*j* respectively, in its magnetic path. The magnets 10*a* through 10*j* may be rotated in a manner similar to that described for the rotation of one magnetic transducer in the application to Walter S. Buslik, Serial No. 629,812, filed December 21, 1956. The novel sensing means of Fig. 1 comprises stationary housings 14 and 16 supported in a manner not shown, and over which the paper tape 8 moves. Bearings 18 and 20 are fixed to housings 14 and 16, respectively, and a hollow cylinder 22 is rotatably supported by the bearings 18 and 20. From Fig. 2 it may be seen that all of the magnets 10*a* through 10*j* are fixed to said cylinder 22 and are set in a potting compound which forms a cylinder 23. Each of the gaps 12*a* through 12*j* are offset circumferentially from each other by a distance approximately equal to the height of the characters on the tape 8**.

The hollow cylinder 22 may be driven by a gearing arrangement and motor in a manner similar to that described in the aforementioned Buslik application. The cylinder is rotated in a counterclockwise direction (in both Figs. 1 and 2). Thus in both Figs. 1 and 2, the air gap **12*a* is shown completing its vertical bottom to top scan of one slice of the character 2 at the same time that the air gap 12b begins its vertical bottom to top scan of an adjacent second slice of the character 2. Passing through the center of the cylinder 22 is a tube 24 supported by the housings 14 and 16 in a manner not shown. The tube 24 carries one arm of a sensing coil 26 which may be connected to signal analyzing means 28**.

Cylinder 22 rotates the air gaps 12a through 12j. As long as there is no magnetic ink from a character in the flux path such as that which comprises the permanent magnet 10a and the gap 12a, no change in current will occur in the coil 26. When a gap, for example 12a, is brought next to the magnetic ink of the character on the paper tape 8, a change in flux is produced through this flux path effecting a change in current in the coil 26.

The current changes during each scan caused by each region of magnetic ink passed by a gap are transmitted as electric signals to a signal analyzing means 28 which may be of any well known type for analyzing printed characters; one example of which is the application, Serial No. 541,592, filed by N. Rochester et al., October 20, 1955.

It can be understood that variations in the structure of Fig. 1 may be made without changing the invention. For instance, the magnetic ink of the characters may be premagnetized and the rotating magnets 10a through 10j may be made of soft magnetic material. Then, when an air gap of the soft magnetic material 10a through 10j is brought adjacent to the field formed by the character, there will be flux changes produced in the rotating members 10a through 10j which will be sensed by the coil 26 and analyzed by the signal analyzing means 28 in much the same manner described hereinbefore.

In addition, instead of the magnets 10a through 10j being of permanent magnetic material, they may be of soft magnetic material and have flux produced through them by the coil passing through the tube 24 with a D.C. voltage bias on it. This latter structure will act in much the same manner as the first structure described.

Figures 3, 4, 5:
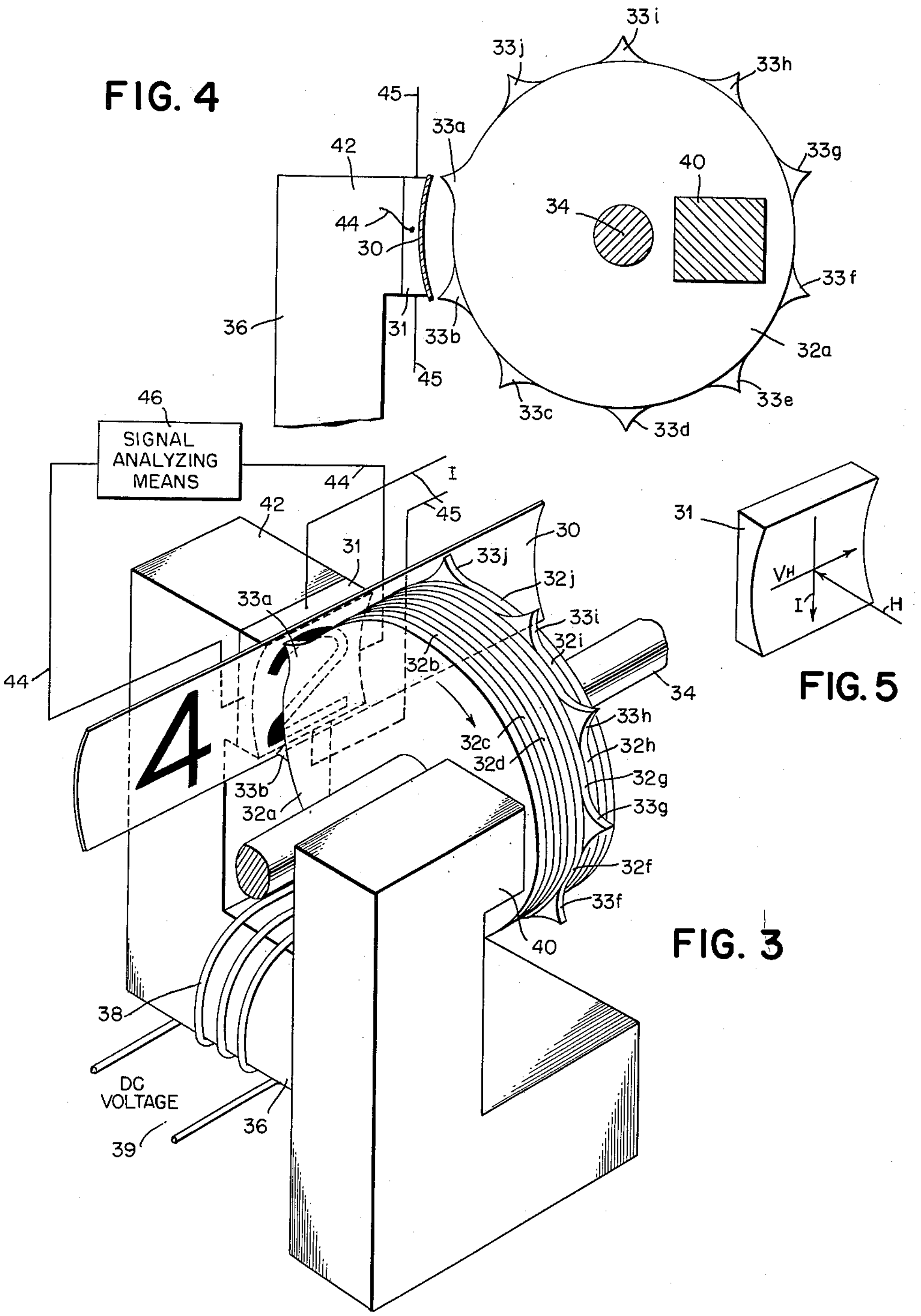
Fig. 3 is a diagrammatic view of a second species of a magnetic ink character sensing device utilizing the Hall effect.
Fig. 4 is a partial side view of the species of Fig. 3 showing a broken away sectional portion of the shaft and magnetic flux path thereof.
Fig. 5 is a diagram illustrating the principle involved in the Hall effect.

A second species of the novel scanning means is shown in Figs. 3 and 4 and makes use of the Hall effect. Paper tape 30 containing magnetic ink characters are moved across a Hall effect strip 31 to a stationary position.

As described in a patent to Hollingsworth, 2,767,911, the Hall effect exhibited by metals utilizes a thin metal strip 31 placed in a magnetic field H (Fig. 5) with the plane of the strip 31 disposed perpendicular to the magnetic lines of force. A current I applied to the strip 31 in a direction perpendicular to the field H produces a voltage $V_H$ transverse to both the magnetic field H and the direction of current application. Variations in magnitude of the field H, with the current I held constant, produces a magnitude variation of the voltage $V_H$.

A plurality of adjacent disks 32a through 32j (Figs. 3 and 4) each have a pointed projection 33a through 33j respectively. The disks 32a through 32j are made of soft magnetizable material and are fastened together and fixed to a rotating shaft 34 supported in any convenient manner. A soft magnetizable core 36 carries a coil 38 which is energized by a constant source 39 of D.C. voltage to produce a magnetic flux which follows a path through the core 36 and its arm 40, through a constant air gap to the side of disk 32a, through all of the disks 32a—32j, through one of the projections 33a through 33j, through an air gap to the paper tape 30, the Hall effect strip 31 and to an arm 42 of the core 36.

Each of the pointed projections 33a through 33j are offset circumferentially from each other by a distance greater than the height of the characters on the tape 30 and greater than the height of the Hall effect strip 31.

The disks 32a through 32j are rotated by the shaft 34 in a clockwise direction (in both Figs. 3 and 4). Thus, in both Figs. 3 and 4 the projection 33a is shown as having completed a vertical bottom to top scan of one slice of the numeral 2 before the projection 32b begins its bottom to top scan of adjacent slice of the numeral.

A magnetic field of a predetermined magnitude is produced by the flux between one of the projections 32a through 32j and the arm 42 of the core 36 through the Hall effect strip 31. This magnetic field will produce a predetermined magnitude of voltage across leads 44 from the Hall effect strip 31 when the current through leads 45 is constant. These leads 44 are connected to a signal analyzing means 46. When a projection, for example 32a, if brought next to the character on the paper tape 30, a change in the field through the Hall effect strip 31 is produced, effecting a change in voltage in the leads 44. The voltage change during each vertical scan caused by the variation in the field due to the magnetic ink of the characters are transmitted as electrical signals to the signal analyzing means 46 which may be of the type similar to the signal analyzing means 28 of Fig. 1.

The structure of Figs. 3 and 4 may be modified by making the core material 36 a permanent magnet rather than using the coil 38 to produce the flux. The rest of the operation will not change however.

Similarly, if the coil 38 were removed and the core 36 were of soft magnetic material, the magnetic ink characters could be premagnetized to produce a field which will be sensed by the Hall effect strip 31 and the signal analyzing means 36.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A device for successively scanning adjacent slices of a non-magnetic background material containing magnetic symbols, comprising a plurality of adjacent rotatable magnetic means for scanning slices of the background material, each of said magnetic means being laterally and circumferentially offset from the adjacent means whereby each magnetic means starts to scan a slice of background material when the adjacent magnetic means ends the scan of an adjacent slice of background material, signal producing means electromagnetically coupled to each of said magnetic means for producing an electrical signal when any magnetic means is moved near a magnetic symbol on said non-magnetic background material, means for rotating said rotatable means.

2. In a device for successively scanning adjacent slices of a non-magnetic background material containing magnetic ink symbols, the combination of a rotatable unitary assembly disposed near said background material, said assembly comprising a plurality of rotatable permanent magnets, each magnet having an air gap, said magnets disposed so that the air gaps are laterally and circumferentially offset from each other whereby when said assembly is rotated each air gap starts to scan a slice of background material after the adjacent air gap ends the scan of an adjacent slice of background material, signal producing means electromagnetically coupled to each of said rotatable magnets for producing an electrical signal when any air gap is rotated in proximity to a magnetic symbol on said non-magnetic background material, and means for rotating said unitary assembly.

3. In a device for successively scanning adjacent slices of a non-magnetic background material containing magnetic ink symbols, the combination of rotatable unitary assembly disposed near said background material, said assembly having a plurality of projecting portions laterally and circumferentially offset from each other whereby when said assembly is rotated each projecting portion starts to scan a slice of background material after the adjacent projecting portion ends the scan of an adjacent slice of background material, electromagnetic means for producing magnetic flux passing from said unitary assembly through said background material, signal producing means electromagnetically coupled to said flux producing means for producing an electrical signal when any projecting portion is rotated in proximity to a magnetic symbol on said non-magnetic background, and means for rotating said unitary assembly.

4. A device for successively scanning adjacent slices of a non-magnetic background material containing magnetic symbols, comprising in combination, a plurality of adjacent rotatable disks, each rotatable disk including a projection portion operative when said disks are rotated for scanning a slice of the background material, Hall effect strips electromagnetically coupled to said rotatable disks for producing an electrical signal when any projecting portion is rotated in proximity to a magnetic symbol on said non-magnetic background material, each of said projecting portions being laterally and circumferentially offset from its adjacent projecting portion, and means for rotating said rotatable disks, each projecting portion starting the scan of its slice after the previous offset adjacent projecting portion ends its scan.

References Cited in the file of this patent

UNITED STATES PATENTS

| | | |
|---|---|---|
| 2,352,023 | Schuller | June 20, 1944 |
| 2,561,476 | Lang | July 24, 1951 |
| 2,830,130 | Greenwood | Apr. 8, 1958 |
| 2,835,743 | Muffley | May 20, 1958 |
| 2,852,732 | Weiss | Sept. 16, 1958 |
| 2,866,013 | Reis | Dec. 23, 1958 |
| 2,897,267 | Prince | July 28, 1959 |

FOREIGN PATENTS

| | | |
|---|---|---|
| 687,130 | Great Britain | Feb. 4, 1953 |
| 760,874 | Great Britain | Nov. 7, 1956 |
| 38,962 | Germany | Sept. 13, 1956 |